(12) United States Patent
Pereverzev et al.

(10) Patent No.: US 11,397,143 B2
(45) Date of Patent: Jul. 26, 2022

(54) DIGESTER SYSTEM FOR PROCESSING A PLURALITY OF SAMPLES FOR CHEMICAL ANALYSIS

(71) Applicant: ColdBlock Technologies Inc., St. Catharines (CA)

(72) Inventors: Kirill Pereverzev, London (CA); Jessica Kishimoto, Toronto (CA); Ravi K. Kanipayor, London (CA); Ron Emburgh, Mississauga (CA)

(73) Assignee: ColdBlock Technologies Inc., Niagara Falls (CA)

( * ) Notice: Subject to any disclaimer, the term of this patent is extended or adjusted under 35 U.S.C. 154(b) by 37 days.

(21) Appl. No.: 16/343,202

(22) PCT Filed: Oct. 19, 2017

(86) PCT No.: PCT/CA2017/051243
§ 371 (c)(1),
(2) Date: Apr. 18, 2019

(87) PCT Pub. No.: WO2018/072023
PCT Pub. Date: Apr. 26, 2018

(65) Prior Publication Data
US 2019/0250083 A1 Aug. 15, 2019

Related U.S. Application Data

(60) Provisional application No. 62/410,592, filed on Oct. 20, 2016.

(51) Int. Cl.
*G01N 1/44* (2006.01)
*G01N 1/42* (2006.01)

(52) U.S. Cl.
CPC ............ *G01N 1/44* (2013.01); *G01N 1/42* (2013.01)

(58) Field of Classification Search
CPC .......... G01N 1/2258; G01N 1/22; G01N 1/24; G01N 1/12; G01N 1/08; G01N 1/20;
(Continued)

(56) References Cited

U.S. PATENT DOCUMENTS 3,346,723 A * 10/1967 Mohn ................ C08G 18/4233
219/553
5,184,419 A * 2/1993 Tallon ................ A01M 1/2094
43/124
(Continued)

FOREIGN PATENT DOCUMENTS

GB 838101 A * 6/1960 ............. F24C 7/065
JP H06208886 A * 7/1994 ........... H04N 13/337
(Continued)

OTHER PUBLICATIONS

Gouveia et al. Infra-red Heating as an Alternative Technique for Fast Sample Preparation. Journal of the Brazilian Chemical Society. 2000, vol. 11, N. 3., pp. 261-265.
(Continued)

*Primary Examiner* — John Fitzgerald
*Assistant Examiner* — Truong D Phan
(74) *Attorney, Agent, or Firm* — Bereskin & Parr LLP/S.E.N.C.R.L., s.r.l.

(57) ABSTRACT

Provided is a system and apparatus for preparing multiple samples for chemical analysis. The apparatus includes a housing having a heating compartment, a cooling compartment spaced apart from the heating compartment, and an insulating region located between the heating compartment. The apparatus has an infrared system including a least one infrared heating tube within the heating compartment for heating a sample within a crucible portion of a sample container while the sample container is received within the housing. The infrared heating tube includes an elongated (Continued)

tube positioned below the crucible portion. The apparatus includes a cooling mechanism for cooling the expansion portion of the sample container while the sample container is received within the housing.

22 Claims, 6 Drawing Sheets

(58) Field of Classification Search
CPC .............. G01N 1/2035; G01N 1/2247; G01N 2001/2057; G01N 1/286; G01N 1/10; G01N 1/42; G01N 1/44
See application file for complete search history.

(56) References Cited

U.S. PATENT DOCUMENTS

| | | | |
|---|---|---|---|
| 6,122,438 | A | 9/2000 | Scherzer et al. |
| 8,955,399 | B2 | 2/2015 | Kanipayor et al. |
| 2009/0185265 | A1* | 7/2009 | Myers .................... G02B 5/124 |
| | | | 359/350 |
| 2011/0239792 | A1* | 10/2011 | Sato ..................... G01N 1/2226 |
| | | | 73/863.11 |
| 2015/0160106 | A1* | 6/2015 | Kanipayor ........... G01N 1/4044 |
| | | | 436/160 |
| 2015/0341988 | A1* | 11/2015 | Messmer ................ F24H 3/002 |
| | | | 392/422 |
| 2017/0243851 | A1* | 8/2017 | Rangelov ................. B23K 3/04 |

FOREIGN PATENT DOCUMENTS

| | | | |
|---|---|---|---|
| WO | WO20110054086 | 12/2011 | |
| WO | WO-2014201548 A1 * | 12/2014 | ................ B01L 7/00 |
| WO | WO20140201648 | 12/2014 | |
| WO | WO20160041063 | 3/2016 | |

OTHER PUBLICATIONS

Written Opinion & International Search Report ofPCT/CA2017/061243, dated Jan. 3, 2018.

* cited by examiner

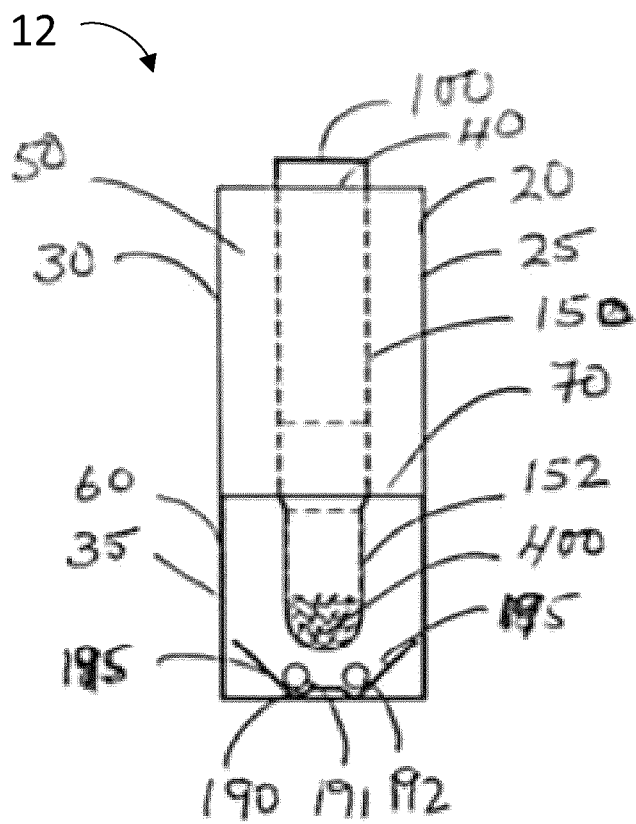
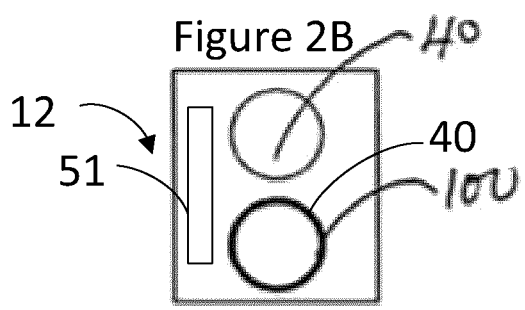
Figure 2B
Figure 2C
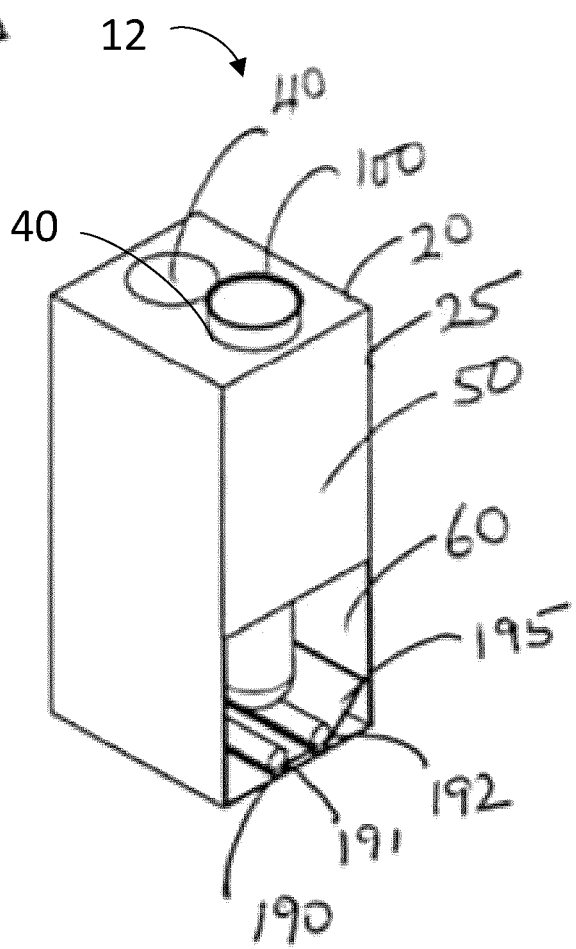
Figure 2A

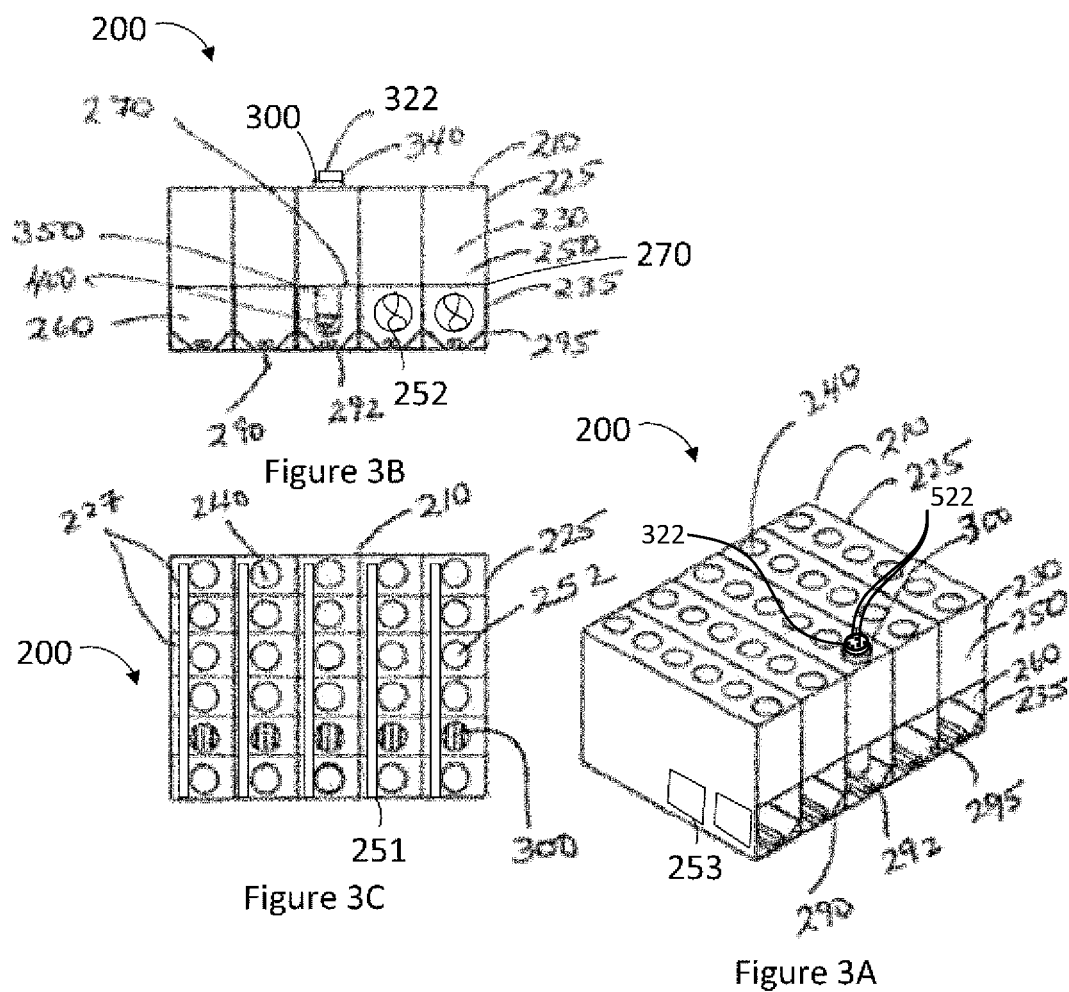

DIGESTER SYSTEM FOR PROCESSING A PLURALITY OF SAMPLES FOR CHEMICAL ANALYSIS

TECHNICAL FIELD

The embodiments disclosed herein relate to a system for preparing multiple samples simultaneously for chemical analysis and, in particular to apparatus, systems and methods for digesting samples into liquids prior to undergoing chemical analysis.

INTRODUCTION

The primary objective of the sample preparation process in inorganic chemical analyses is to bring the analytical components of interest (the "analytes") from solid/semi-solid/suspended liquid matrices into aqueous so as to be analyzed by analytical instruments such as Inductively Coupled Plasma Mass Spectrometer (ICP-MS), Inductively Coupled Plasma Spectrometer (ICP-OES), Atomic Absorption Spectrometer and the like.

The types of samples for preparation prior to analysis include wastewater, sludge, sediments, soils, rocks, foods, powder, industrial and manufactured products, animal and plant tissue, plastics, oils, steel, greases, coal, cements, and paint chips. The areas of analytical applications are also diverse and include environmental, geological, food, agriculture and forestry, pharmaceutical, industrial quality control etc. One common trait among these applications is that in most cases, each sample undergoes sample preparation, before they can be analyzed using analytical equipment.

There are different types of sample preparation procedures for solubilization of the analyte into a liquid medium, generally aqueous. In order to achieve full solubilization, the analyte is completely released from the solid or semi-sloid sample and converted into a form which is readily soluble in the liquid medium. For quantitative results, such sample preparation procedures should also take into consideration volatility and decomposition of the analyte. The following are a few examples of these sample preparation procedures.

Acid digestion is a procedure in which a sample reacts with hot liquid acid or acid mixture resulting in dissolving the sample completely or partially into the liquid medium. Generally, this is carried out in a suitable beaker placed on a hot plate. This procedure uses large volumes of acids, which evaporate and escape into the environment at temperatures used for digestion. For safety reasons, such open-vessel digestion process must be carried out inside large and expensive acid resistance fume hoods with appropriate exhaust scrubbers, in order, to vent harmful gaseous emissions and corrosive acid vapours to the atmosphere. The scrubbers are used to minimize the release of corrosive acids into the atmosphere. Unfortunately, the scrubbers produce large volumes of acidified wastewater, which still represents an environmental disposal issue. Conventional acid digestion also has a number of other problems. In particular, digestion can take many hours, requires continuous monitoring, large quantities of acids and is manual and labour intensive. Conventional acid digestion is also prone to element loss, contamination problems and generally has poor precision. It is also difficult to automate and computerize the digestion process on hot plate. The handling of quantities of hot acid also represents a safety issue.

In some laboratories, acid digestions are performed using "hot block" digestion vessels, which are large heated blocks having a number of openings for receiving test tubes containing samples and acid. While this allows some degree of automation and control, acid digestion in a hot block is still prone to the other disadvantages noted above.

Microwave acid digestion is another sample preparation process whereby a sample and acid are placed into a closed vessel and heated by microwave radiation. Volatile elements are contained within the closed vessel, which can offer better control of exhaust fumes and can reduce environmental impact. Microwave acid digestion also tends to use less acid compared to hot block digestion because the acid is contained within the closed vessel. However, microwave acid digestion still suffers from a number of problems. For example, some samples can take longer to digest in comparison to acid digestion in a beaker or hot block. Furthermore, the pressurized closed vessels can be expensive to make, hard to clean, and difficult to work with. Sample sizes are often limited to 0.2-1.0 grams. Another drawback is that the digestion vessel is often made from Teflon, which limits the maximum digestion temperature to about 245° C., otherwise the Teflon lining might distort or deteriorate and can contaminate the sample. With these limitations, microwave digestion can be hard to automate, expensive, and typically results in low production rates with limited batch capacity. Accordingly, while microwave acid digestion might be appropriate for low volume laboratories that focus on digesting certain difficult samples, the process is less attractive to high volume laboratories, which tend to focus on productivity and costs while analyzing a diverse range of samples.

Apparatus, systems and methods for preparing samples for chemical analysis are described in PCT Patent Application No. WO2011/054086, to the same inventors. The system comprises at least one sample container, and a container receptacle apparatus for receiving the sample container. The sample container comprises an elongate tubular body having a crucible portion proximal to a closed end for receiving a sample therein, and an expansion portion proximal to an open end. The container receptacle apparatus comprises a housing having a heating compartment, a cooling compartment spaced apart from the heating compartment, and an insulating region located between the heating compartment and the cooling compartment. The heating compartment is shaped to receive the crucible portion of the sample container, and the cooling compartment is shaped to receive the expansion portion of the sample container. The apparatus also includes a heating mechanism for heating the sample within the crucible portion of the sample container, and a cooling mechanism for cooling the expansion portion of the sample container.

While the apparatus, system and method described in US Patent application publication number 2015/0160106 may address the drawbacks identified above in respect of conventional sample preparation processes, further refinements have been made to accommodate multi sampling system for simultaneous sample preparation procedure. These refinements and improvements are described below.

SUMMARY

According to some embodiments, there is an apparatus for preparing samples for chemical analysis. The apparatus includes a housing having a heating compartment, a cooling compartment spaced apart from the heating compartment, and an insulating region located between the heating compartment and the cooling compartment for thermally insulating the heating compartment from the cooling compartment. The heating compartment is shaped to receive a crucible portion of a sample container and the cooling compartment is shaped to receive an expansion portion of the sample container.

The apparatus includes an infrared system including a least one infrared heating tube within the heating compartment for heating the sample within the crucible portion of the sample container while the sample container is received within the housing. The infrared heating tube includes an elongated tube positioned below the crucible portion.

The apparatus includes a cooling mechanism for cooling the expansion portion of the sample container while the sample container is received within the housing.

The infrared system may include two infrared heating tubes that are spaced apart.

The infrared system may include two infrared heating tubes that are fused together.

The infrared system may include a reflector positioned below and adjacent the infrared heating tube for reflecting infrared heat towards the crucible portion.

The apparatus may further include a first sample container arranged adjacent a second sample container.

The infrared heating tube may simultaneously heat the crucible portions of both the first and second sample containers.

The crucible portions of the first and second sample containers may be separated by an opening for providing air flow.

The apparatus may further include a fan for providing airflow through the opening.

The apparatus may further include plurality of container receptacles arranged in rows and columns.

The apparatus may further include a stopper for enclosing the expansion portion and having pinholes therein for allowing condensation in the expansion portion of the sample container.

The apparatus may further include a controller for controlling the infrared heating tube, the cooling system and the fan.

The sample container may include an elongate tubular body extending from an open end to a closed end, the tubular body having a crucible portion proximal to the closed end for receiving the sample therein, and an expansion portion proximal to the open end.

According to some embodiments, there is a system for preparing a plurality of samples for chemical analysis. The system includes a housing that is configured to receive a plurality of sample containers aligned in rows. The housing includes a plurality of elongated heating compartments, a plurality of cooling compartments spaced apart from the heating compartments, and a plurality of insulating regions located between the heating compartments and the cooling compartments for thermally insulating the heating compartments from the cooling compartments. Each of the heating compartments is shaped to receive crucible portions of at least two sample containers in a row, and the cooling compartments are shaped to receive expansion portions of the sample containers.

The system includes an infrared system having a pair of elongated infrared heating tubes that extend along the heating compartment so as to be capable of heating the crucible portions of the at least two sample containers while the sample containers are received within the housing.

The system includes a cooling mechanism for cooling the expansion portion of the sample container while the sample container is received within the housing.

The sample container may include an elongate tubular body extending from an open end to a closed end, the tubular body having a crucible portion proximal to the closed end for receiving the sample therein, and an expansion portion proximal to the open end.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIGS. 2A, 2B, and 2C are perspective, front, and top views, respectively, of a chemical analysis apparatus, in accordance with a second embodiment;

FIGS. 3A, 3B, and 3C are perspective, front, and top views, respectively, of a sample preparation system having a plurality of the chemical analysis apparatus of FIG. 1A;

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Figure 1B:
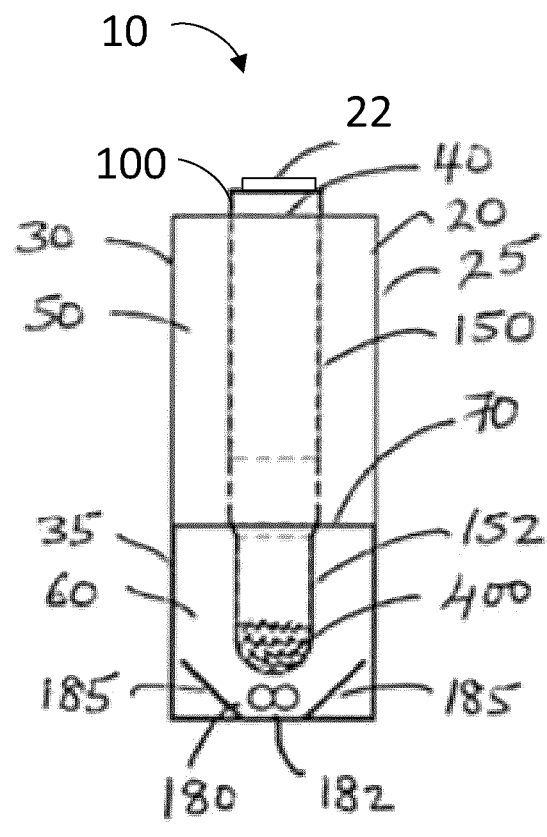
FIGS. 1A, 1B, and 1C are perspective, front, and top views, respectively, of a chemical analysis apparatus, in accordance with an embodiment.
Figure 1C:
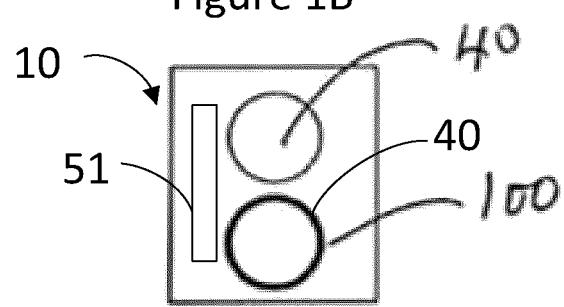
Figure 1A:
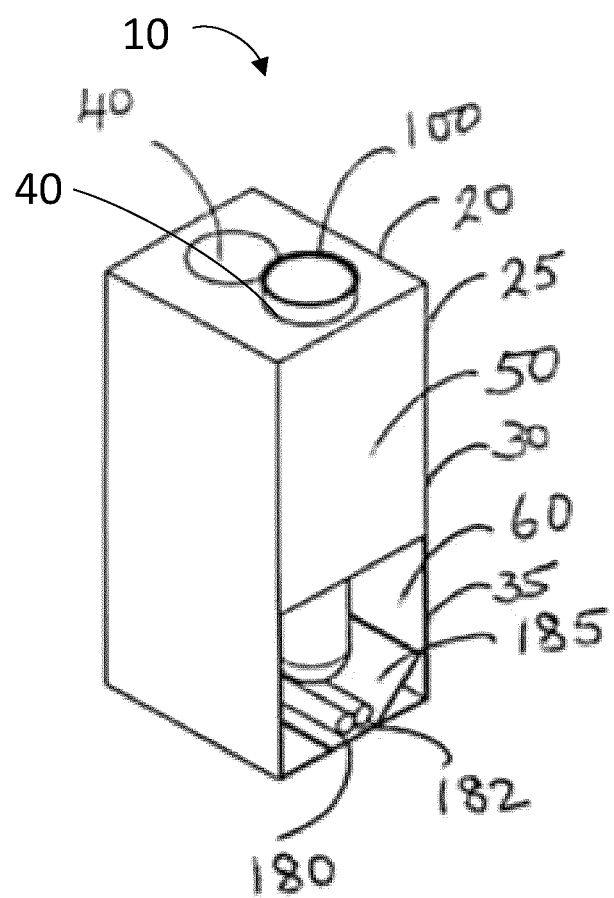

Referring now to FIGS. 1A-1C, illustrated therein is an apparatus 10 for preparing samples for chemical analysis, in accordance with an embodiment. The apparatus 10 comprises at least one removable sample container 100 for holding a sample 400, and a container receptacle 20 (digester unit) for receiving the at least one sample container 100.

The sample container 100 may include a removable sample container stopper 22 for enclosing the sample container 100. The sample container 100 is tapered towards the bottom and has a narrow elongated protrusion at the bottom, which typically defines a crucible portion 152 of the sample container 100. The crucible portion 152 serves as a hot reaction chamber for digesting, dissolving or otherwise preparing samples for chemical analysis. At the same time, an upper larger chamber of the sample container defines an expansion portion 150 of the sample container.

The container receptacle 20 generally includes a compartment or housing 25, which has an upper block 30 on the top of the housing 25 that is shaped to receive or otherwise accommodate the sample container 100 and which defines a cooling compartment 50. Below the upper block 30 is a digester base 35, which defines a heating compartment 60 of the housing 25. The upper block 30 of the housing 25 has first and second cavities 40 to receive first and second sample containers 100. The upper block 30 and the digester base 35 may be generally rectangular. The cavity 40 may be generally cylindrical to receive the sample container 100 that is generally cylindrical.

The heating compartment 60 includes one or more infrared systems 180, with an infrared heating tube 182 for emitting infrared heat to the sample 400 when the sample container 100 is received within the housing 25. In the illustrated embodiment, the infrared system 180 has an emitter made up an infrared heating tube 182 placed at the bottom of the digester base 35 within the heating compartment 60. The infrared system 180 may include two infrared heating tubes 182 fused together. Underneath the infrared heating tube 182 is a light reflector plate 185 which is shaped to focus the scattered light back to the crucible portion 152 of the sample container 100. The infrared heating tube 182 is connected to a controller (described with respect to FIG. 6) for controlling heat output, and in particular for increasing and maintaining the temperature of the sample 400 at a predetermined heating temperature for a predetermined amount of time.

Figure 4A:
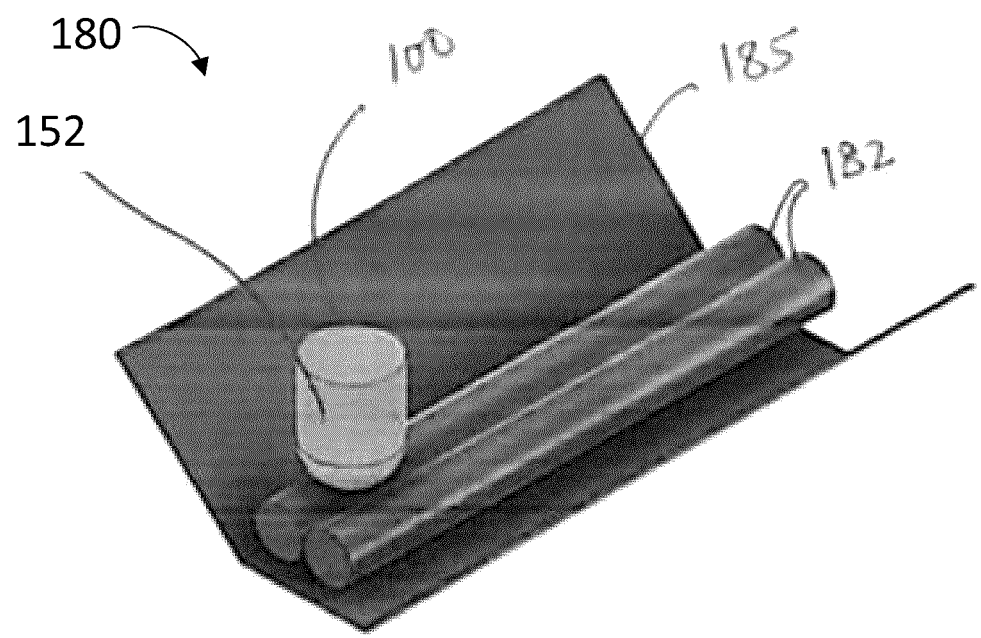
FIGS. 4A and 4B are perspective and front end views, respectively, of a heating mechanism of the chemical analysis apparatus of FIG. 1A.
Figure 4B:
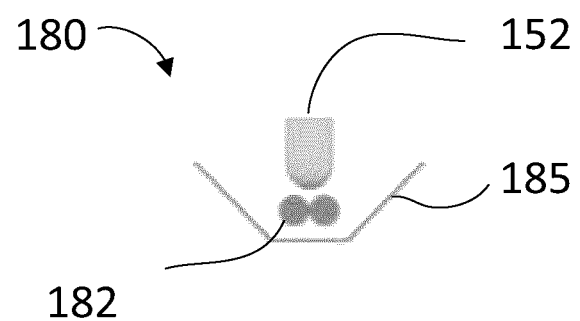

FIGS. 4A and 4B illustrate the infrared system 180. The infrared system 180 includes the infrared emitter 182 and the light reflector plate 185 placed inside the heating compartment. The controller, power connections and computer systems with custom software may also be part of the infrared system 180.

The infrared system 180 includes a pair of elongated heating tubes 182 that extend along the heating compartment 60 so as to be capable of heating the crucible portions 152 of several containers 100 while the sample containers 100 are received within the housing 25.

Referring again to FIGS. 1A-1C, the digester base 35 is shaped to receive a crucible portion 152 of the sample container 100, which tapers downward from the rest of the tubular body of the sample container 100 and generally forms a protrusion extending outward from the bottom therefrom. When the sample container 100 is received within the housing 25 of the container receptacle 20, the crucible portion 152 sits just above the infrared heating tube 182 with an air gap between the infrared heating tube 182 and crucible portion 152 of the sample container. The crucible portion 152 of the sample container 100 receives the sample 400, and the infrared emitter 182 directly heats the sample 400 within the crucible portion 152 while the sample container 100 is received within the housing 25 of the container receptacle 20.

The upper portion of the container receptacle 20, above the digester base 35, defines a cooling compartment 50 of the housing 25, which houses a cooling mechanism 51 such as a condenser coil, Peltier or another suitable cooling mechanism. The condenser coil may contain circulating refrigerant, cold water or another appropriate coolant and may be thermostatically controlled to maintain the cooling compartment 50 at a predetermined cooling temperature (for example 5-10° C., or less than about 0° C.). The cooling compartment 50 generally surrounds and generally cools the expansion portion 150 of the sample container 100. The chemical digestion apparatus 10, may also include a second cooling mechanism for cooling the heating compartment 60.

The housing 25 also has an insulating region 70 located between the heating compartment 60 of the digester base 35 and the cooling compartment 50 of the upper block 30. The insulating region 70 thermally insulates the heating compartment 60 from the cooling compartment 50. More particularly, the insulating region 70 maintains a cold temperature in the cold zone inside the cooling compartment 50 of the upper block 30 and maintains a hot temperature in a heating compartment 60 of the digester base 35.

FIGS. 2A-2C, illustrates an apparatus 12 for preparing samples for chemical analysis, in accordance with an embodiment. The apparatus may have a similar configuration to the apparatus 10 as described in FIGS. 1A-1C except for the infrared system 190.

The heating compartment 60 includes one or more infrared systems 190, including infrared heating tube emitters 191, 192 for directly heating the sample 400 when the sample container 100 is received within the housing 25. In the illustrated embodiment, the infrared system 190 has two independent infrared heating tube emitters 191 and 192 placed at the bottom of the digester base 35 within the heating compartment 60. The infrared heating tubes 191, 192 are spaced apart from each other such that when the sample container 100 is placed in the container receptacle 20, the crucible portion 152 sits just above and in between the infrared heating tubes 191, 192 with an air gap between the emitter and crucible portion of the sample container.

The infrared heating tubes 191, 192 are strategically placed above and adjacent the light reflector plate 195 which is shaped to focus the scattered light back to the crucible portion 152 of the sample container 100. The infrared heating tubes 191, 192 are positioned on top of the reflector 195 so as to focus the emitted infrared radiation to the bottom of the crucible portion 152 of the sample container 100. The infrared heating tubes 191, 192 are connected to a controller (described with respect to FIG. 6) for controlling heat output, and in particular for increasing and maintaining the temperature of the sample 400 at a predetermined heating temperature for a predetermined amount of time.

Figure 5A:
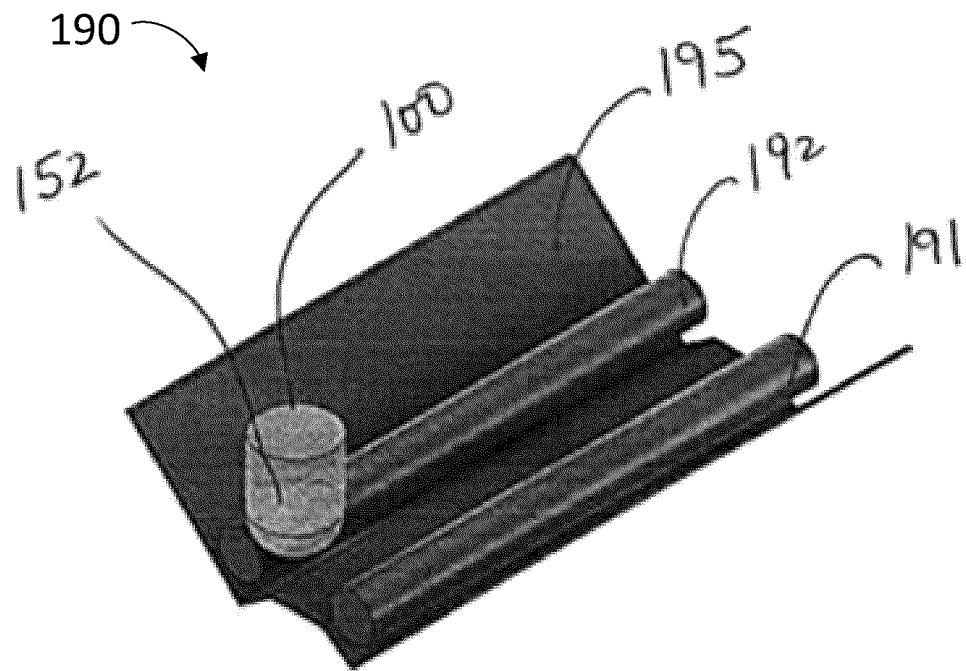
FIGS. 5A and 5B are perspective and front end views, respectively, of a heating mechanism of the chemical analysis apparatus of FIG. 2A.
Figure 5B:
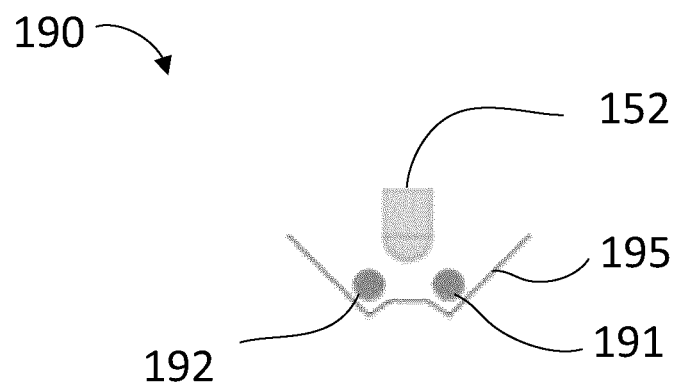

FIGS. 5A and 5B illustrate the infrared system 190. The infrared system 190 includes the infrared heating tubes 191, 192 and the reflector plate 195 placed inside the heating compartment. The controller, power connections and computer systems with custom software may be part of the infrared system 190.

The infrared system 190 includes a pair of elongated heating tubes 191, 192 that extend along the heating compartment 60 so as to be capable of heating the crucible portions 152 of several containers 100 while the sample containers 100 are received within the housing 25.

Referring now to FIGS. 3A-3C, therein is a sample preparation system 200, in accordance with an embodiment. The sample preparation system 200 includes a container apparatus 210 with plurality of single chemical analysis units 227 (as shown in FIGS. 1A-1C) for receiving plurality of removable sample containers 300. The removable sample containers 300 hold the sample 400, in each sample container 300.

The sample containers 300 may include removable sample container stoppers 322 for enclosing each sample container 300. Each sample container 300 is tapered towards the bottom and has a narrow elongated protrusion at the bottom, which typically defines the crucible portion 350 of the sample container. The crucible portion serves as a hot reaction chamber for digesting, dissolving or otherwise preparing samples for chemical analysis. At the same time, the upper larger chamber of the sample container defines an expansion portion 340 of the sample container.

The container apparatus 210 generally includes a rectangular compartment or housing 225, which has an upper block 230 on the top of the housing 225 that is shaped to receive or otherwise accommodate the sample containers 300 and defines a cooling compartment 250. Below the upper block 230 is a digester base 235, which defines a heating compartment 260 of the housing 225. The upper block 230 of the housing 225 has a generally cylindrical plurality of cavities 240 to receive the generally cylindrical sample containers 300. The upper block 230 and the digester base 235 may be generally rectangular.

The heating compartment 260 includes plurality of infrared systems 290, each with at least one infrared heating tube 292, for directly heating the sample 400 when the sample container 300 is received within the housing 225. In the illustrated embodiment, each infrared system 290 has an emitter made up of two fused infrared heating tubes 292 placed at the bottom of the digester base 235 within the heating compartment 260. Underneath and adjacent the infrared heating tube 292 is a light reflector plate 295 which is shaped to focus the scattered light back to the crucible portion 350 of the sample container 300. The infrared heating tube 292 is connected to a controller (described with respect to FIG. 6) for controlling heat output, and in particular for increasing and maintaining the temperature of the sample 400 at a predetermined heating temperature for a predetermined amount of time. The infrared heating tube 292 and the light reflector plate 295 placed inside the heating compartment along with the controller board makes up the infrared system 290.

In the illustrated embodiment, there are thirty of the upper block 30 such infrared systems 290 arranged in a six row by five column configuration within the heating compartment 260 of the digester base 235. Single controller board may be used to control all infrared systems and may be programmed and operated simultaneously or independently. In the illustrated embodiment in FIGS. 3A-3C, all thirty upper block 30 infrared systems 290 are arranged within the same heating compartment 260 of the digester base 235 in such a way that each infrared system along with each corresponding to generally rectangle section of the upper block 230 with the cavity 240 as illustrated in FIGS. 1A-1C constitutes as one chemical analysis unit 227. Thus it is to be understood that in the illustrated embodiment in FIGS. 3A-3C there are thirty upper block 30 such chemical analysis units 227 as illustrated in FIGS. 1A-1C exists for simultaneous sample digestion of a plurality of the samples 400.

The digester base 235 is shaped to receive crucible portions 350 of sample containers 300, which tapers downward from the rest of the tubular body of the sample container 300 and generally forms a protrusion extending outward from the bottom therefrom. When the sample containers 300 are received within the housing 225 of the container apparatus 210, the crucible portion 350 of sample container 300 sits just above the infrared heating tube 292 with an air gap between the infrared heating tube 292 and crucible portion 350 of the sample container 300. The crucible portion 350 of the sample container 300 receives the sample 400, and the infrared heating tube 292 directly heats the sample 400 within the crucible portion 350 while the sample container 300 is received within the housing 225 of the container apparatus 210.

The upper block 230 of the housing 225 of the container apparatus 210, above the digester base 235, defines a cooling compartment 250, which houses a cooling mechanism 251 (shown schematically) such as a condenser coil, Peltier or another suitable cooling mechanism. The condenser coil may contain circulating refrigerant, cold water or another appropriate coolant and may be thermostatically controlled to maintain the cooling compartment 250 at a predetermined cooling temperature (for example 5-10° C., or less than about 0° C.). The cooling compartment 250 generally surrounds the upper part of the cavity 240, and generally cools the expansion portion 340 of the sample container 300.

The housing 225 also has an insulating region 270 located between the heating compartment 260 of the digester base 235 and the cooling compartment 250 of the upper block 230. The insulating region 270 thermally insulates the heating compartment 260 from the cooling compartment 250. More particularly, the insulating region 270 maintains a cold temperature in a cold zone 252 within the cavity 240 of the upper block 230 and maintains a hot temperature in a heating compartment 260 of the digester base 235.

The sample container 300 could be made from quarts or other materials such as borosilicate glass (e.g. Pyrex™ glass), or clear crystalline materials. In some cases, cooling the crucible portion 135 may allow the sample container 300 to be made from materials that would otherwise decompose or break-down at temperature commonly used with hot block digestion.

The sample container 300 may include one or more graduation markings such as a 25 mL mark, and a 50 mL mark. The markings may assist a technician when adding the acids, or when adding a liquid to the sample container 300 so as to prepare a final volume of sample solution for subsequent chemical analysis.

In some embodiments, the sample container may also include a bar code. This may be useful during atomization of the digestion process.

When using the sample container 300, the crucible portion 135 may serve as a digestion zone or a hot zone where the sample 400 is heated for digesting, dissolving or otherwise preparing samples for chemical analysis. Furthermore, the expansion portion 340 may serve as a refluxing area or cooled expansion zone where vaporized acid and other volatile vapors can initially expand, and then condense and reflux back to the crucible portion. This can prevent the loss of acid and other volatile components being analyzed. However, some of the unwanted reaction gases may be separated from the vaporized acid and other volatile vapors and those unwanted reaction gases can escape through the open mouth of the sample container or, if using a suitable stopper 322, through the gas escaping holes of the stopper placed on the mouth of the sample container. The stopper 322 may enclose the expansion portion 340 and have pinholes 522 therein for allowing condensation in the expansion portion 340 of the sample container 300.

Each infrared system 290 is configured to emit infrared radiation towards the sample 400 within the crucible portion 350 placed inside the corresponding chemical analysis unit 227. The wavelength of the infrared radiation is generally selected to be absorbed by the sample 400 so as to heat the sample 400. For example, the infrared radiation may have a wavelength of between about 700-nm and about 1-mm. More particularly, the infrared radiation may have a wavelength of less than about 3-μm, or more particularly still, less than about 1.4-μm. In some cases, the infrared radiation may have a peak energy at about 1-μm.

The infrared system 290 includes two fused infrared heating tubes 292 in one infrared emitter system 290. It is also to be understood that the embodiment such as that illustrated in FIGS. 3A-3C can also be constructed according to unit described in FIGS. 2A-2C using infrared system 190.

The infrared emitter systems are sized and shaped to provide infrared radiation to the bottom of the crucible portion 350 of the sample container 300, placed inside the corresponding chemical analysis unit 227 of the housing 225, having quartz tube, ceramic or gold reflectors, halogen or tungsten filaments, and a max power of 250 W. Such infrared emitter tubes are sold by vendors such as Anderson Thermal Devices Inc. These infrared emitters are capable of emitting short infrared wavelengths of about 1.15-μm at peak energy with filament temperatures of up to about 2400° C.

The illustrated number of samples and configuration is an example and that other configurations other than 30 sample in 5×6 configuration are possible. An advantage of the system 200 may include the replacement of 30 separate heating rings with the five pairs of heating rods.

The infrared system 290 may be a series of elongated emitter tubes placed at the bottom of the digester base 235 within the heating compartment 260 and spaced apart such that each emitter tube sits just below the crucible portion 350 of a row of sample containers 300 placed within the container receptacle. Thus one single infrared emitter tube will provide infrared radiation to a row of the samples 400 placed inside the crucible portion 350 of the sample containers 300.

FIG. 3B is the cross section view of the container apparatus 210 of the sample preparation system 200 showing the configuration of the crucible portions 350 of a row of sample containers 300 placed above a single infrared emitter system 290 placed at the bottom of the digester base 235, across the length of the row of the sample containers.

The apparatus 200 as illustrated in may include a first cooling mechanism 251 for cooling the expansion portion 340 of the sample container 300, and if needed, a second cooling mechanism 252 for cooling the crucible portion 350 of the sample container 300. The first cooling mechanism 251 includes a thermoelectric cooler such as a Peltier cooler or coolant liquid circulating system, and the second cooling mechanism 252 may include a fan such as a variable speed exhaust fan or mechanical ventilation. In other embodiments, the cooling mechanisms could include other types of thermoelectric coolers, fans, refrigeration units, heat pumps, and the like, or combinations thereof. Furthermore, a single cooling mechanism could be used to cool both the crucible portion 350 and the expansion portion 340 of all sample containers 300 placed inside the chemical analysis units 227 of the housing 225 of the container apparatus 210 of the sample preparation system 200.

The first cooling mechanism 251 cools the expansion portion 340 of the sample container 300. Cooling the expansion portion 340 of the sample container 300 can help minimize vaporization by reflux condensation of the acid mixture and analytes during digestion of the sample 400. For example, when the sample 400 undergoes decomposition during digestion, some of the acid or acid mixture and volatile analytes may evaporate and rise to the expansion portion 340. The first cooling mechanism 251 may help condense and reflux these vapors back to the crucible portion 350.

The first cooling mechanism 251 circulates colder air within the cooling compartment 250. For example, the first cooling mechanism within the cooling compartment 250 may be configured to maintain the cooling compartment 250 at a desired cooling temperature of, for example, less than about 10° C., or more particularly, less than about 5° C. Circulating air within the cavities 240 within the cooling compartment 250 can indirectly cool the expansion portion 340 of the sample container 300.

In other embodiments, the first cooling mechanism 251 may cool the expansion portion 340 in other ways, which may include direct or indirect cooling. For example, another type of coolant or cooling medium may indirectly cool the expansion portion 340 (e.g. using a refrigeration unit).

Alternatively, the expansion portion 340 may be cooled through conductive heat transfer, for example, using a cooling block, in which the first cooling mechanism cools the upper block 230, which then cools the expansion portion 340. The second cooling mechanism 252 could also use these and other cooling techniques.

Removing heat from the crucible portion 350 of the sample container 300 can be desirable in order to help maintain the temperature of the acid or acid mixture below the boiling point in order to reduce vaporization of the acid or acid mixture. This can help reduce escape of vapour as described above. Moreover, less vaporization can also reduce the amount of cooling for maintaining the expansion portion 340 of the sample container 300 at a desired temperature.

The second cooling mechanism 252 can generally configured to maintain the heating compartment 260 at a temperature below the boiling point of the acid or acid mixture other liquid reactants. The second cooling mechanism 252 can be configured to provide cooling of the heating compartment 260. The cooling can be as described above and may simply be a natural air flow through openings, apertures, or windows 253 in the digester base 235 of the housing 225. The second cooling may be achieved simply by the natural flow of room air through the heating compartment 260 of the digester base 235 through windows 253 strategically placed on the opposite walls of the digester base 235.

In some embodiments, the second cooling mechanism 252 may be configured to maintain the heating compartment 260 at a temperature of below 100° C., or more particularly, near room temperature (e.g. about 20-22° C.). This may be useful when using the acid, acid mixture or other liquid reactants have boiling points near 100° C. (which is common with aqueous solutions and some acids such as hydrochloric acid, nitric acid, and hydrofluoric acid). In other examples, the temperature may be higher or lower. For example, sulphuric acid and phosphoric acid have higher boiling points near 300° C., and in such cases, the second cooling mechanism 252 may be configured to maintain the heating compartment 260 at a temperature below 300° C.

The second cooling mechanism 252 may include one or more fans. For example, there may be a first fan for removing hot air from the heating compartment 260, and a second fan for introducing cool air into the heating compartment 260. The first and second fans may be positioned on opposite sides of the heating compartment 260 for cooling the crucible portions 350 of the row of sample containers 400.

The second fan may be configured to draw cool air into the heating compartment 260 from cooling compartment 250. In such cases, there may be a third fan for directing air from the cooling compartment 250 towards the second fan in the heating compartment 260. The second cooling mechanism 252 may also be used for the chemical analysis systems 10, 12, described with reference to FIGS. 1A-2C.

Additionally or alternatively, the second fan may be configured to draw in cool air from an external source such as room temperature air, or from another external source of cool air. In such cases, the container apparatus 210 may have one or more air intake apertures or windows 253 extending through the walls of digester base 235 and into the heating compartment 260.

As described previously, the infrared system 290 may be selected to emit infrared radiation that is absorbed by the sample 400. The infrared radiation may also be selected to be partially or completely transmitted through the sample container 300 and the acid or acid mixture or other sample processing liquid or liquid mixture. Thus, the infrared radiation may be selected to directly energize the sample 400 without appreciably heating the sample container 300 or the liquid therein.

For example, liquid reactants such as acids and other aqueous solutions tend to be more transparent to infrared radiation as compared to microwave radiation, particularly for near-infrared and short infrared wavelengths. Accordingly, infrared radiation can offer a greater amount of input radiation energy to energize the sample 400 directly, and thereby initiate chemical transformation of the sample in the presence of the liquid reactant (e.g. the acid or acid mixture). Furthermore, excess thermal energy released from transformation of the sample 400 to the acid can be removed by the second cooling mechanism 252 which may help maintain the temperature of the acid below its boiling point.

Thus, removal of thermal energy from the acid, though against conventional theories, can enhance sample digestion and can allow more input energy to further enhance or speed up the digestion process. In some examples, the increased input energy may be equivalent to 800° to 900° C. at the surface of the sample 400, which can provide faster sample decomposition or allow more complete digestion of difficult samples. Moreover, in some examples, the infrared heating mechanism may be capable of producing temperatures of up to 2000° C. at the surface of the sample 400, which can further enhance sample decomposition.

In some embodiments, it may be desirable to pressurize the sample container 300 during digestion. For example, increased pressure in the crucible portion 350 can increase the boiling points of the acid or other liquids. This can help reduce vaporization of both the acid and analytes while also allowing even more input energy to the sample 400. Moreover, increased pressure in the expansion portion 340 can enhance condensation of any vaporized gases.

In some applications, partial pressure can be achieved through the use of the removable stoppers 322 loosely placed on top of the mouth of the sample containers 300. The removable stopper 322 may be designed such a way to provide refluxing condition while allowing slow escape of unwanted gaseous bi-products produced during the chemical reaction in the crucible portion 350.

When directly heating the sample 400 with radiation, it may be desirable for the crucible portion 350 of the sample container 300 to be substantially or completely transparent to the radiation being used to heat the sample 400. For example, when using infrared radiation, it may be desirable for the sample container 300 to be made from quartz, which is substantially transparent to infrared radiation. This can help prevent hot spots on the crucible portion 350, and can also provide more even heating to the sample 400.

In a further embodiment, one or more of the infrared system 290, may be moveable lengthwise (e.g., on a track), parallel to the length of the crucible portion 350 and proximal to the crucible portion 350 of the sample container 300. This may allow the infrared heating tube 292 to emit radiation transversely along some of, or the entirety of the crucible portion 350. The infrared system 290 could be moved manually or through an actuator. As an example, the actuator could be controlled mechanically, electrically, or through computer software.

The angular direction of the infrared system 290 rods could also be controlled with the reflector 295, for example, to focus radiation at a narrow region or disperse radiation over a wider region. In some embodiments, the region may range from 5 mm-10 mm of the bottom curvature of the crucible portion 350 or from 5-mm to 45-mm in length along the crucible portion 350. The angular direction of the radiation may be adjusted using a gold coating on the reflector 295, or using another reflective material such as quartz powder or a ceramic. The reflector 295 may be located on or near the infrared system 290.

Figure 6:
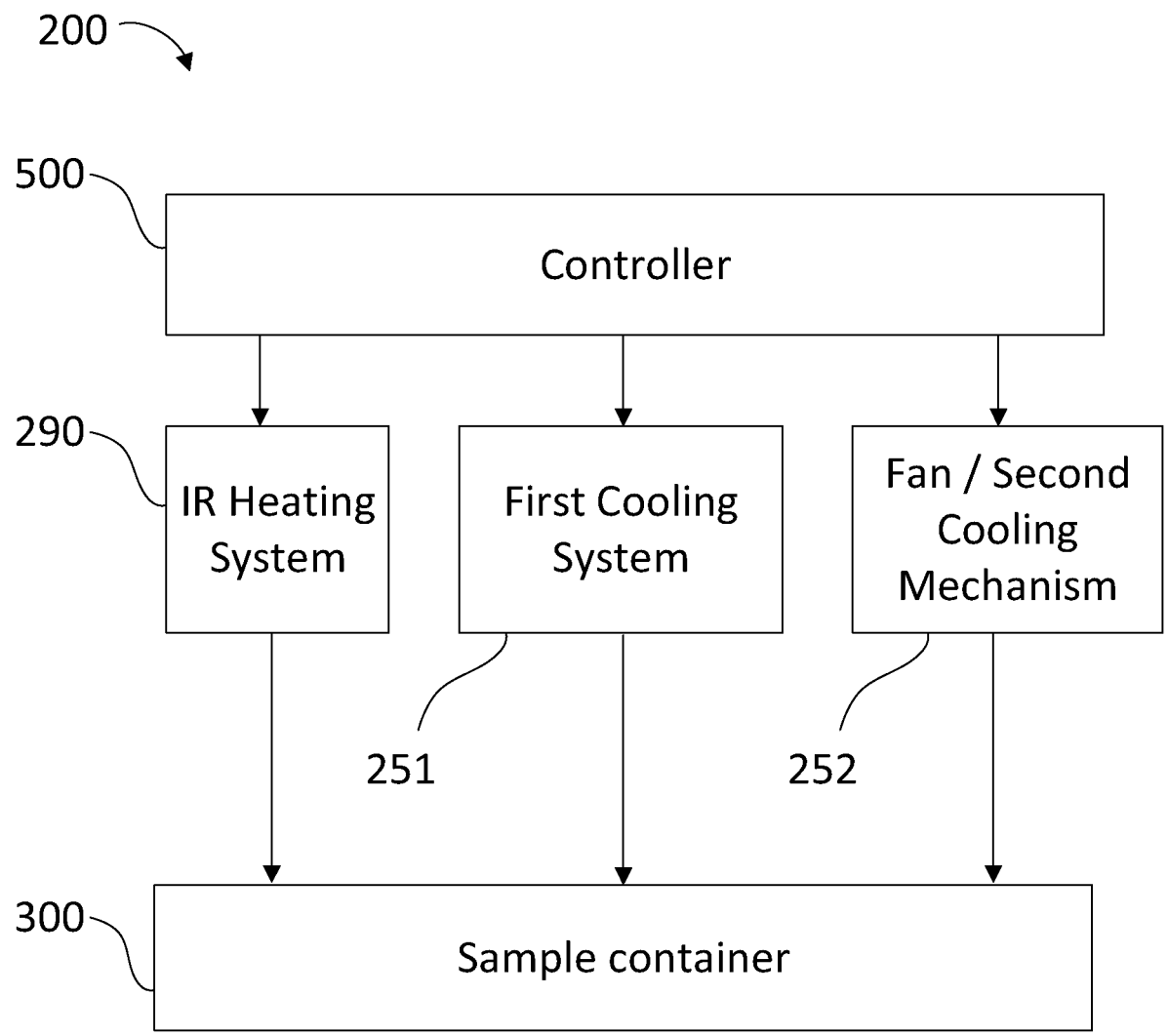
FIG. 6 is a block diagram of a system for chemical analysis, in accordance with an embodiment.

FIG. 6 illustrates the system 200 schematically, in accordance with an embodiment. The system 200 includes a controller 500 for operating the infrared system 290. The controller 500 may control and adjust continuously and/or separately the output power of the infrared emitters 290. This may allow the sample to reach a desired heating temperature for sample digestion. The heating time may also be controlled.

In addition to controlling the infrared system 290, the controller 500 may also control other components of the sample preparation system 200 such as other cooling mechanisms, 251, 252 including the Peltier cooler of the first cooling mechanism in the cooling compartment 250. Thus, the controller can be used to control temperatures in both the heating compartment 260 and the cooling compartment 250.

The controller 500 can also be configured to control cool-down times. For example, the controller 500 may activate the first or second cooling mechanisms 251, 252 after sample digestion is complete in order to cool down the sample container 300. This can allow users to pick up and handle the sample container 300 after digestion. In some cases, the cool-down time may be about 1-minute in comparison to 4-hours or more for hot block digestion devices.

The infrared system 290 may be configured to emit near-infrared wavelengths (e.g. 0.75-μm to 1.4-μm), short infrared wavelengths (e.g. 1.4-μm to 3-μm), medium infrared wavelengths (e.g. 3-μm to 8-μm), long infrared wavelengths (e.g. 8-μm to 15-μm), far-infrared wavelengths (e.g. 15-μm to 1000-μm), or combinations thereof. The controller 500 may select a specific infrared wavelength, for example, depending on the type of sample being digested or other aspects of the digestion being performed. For example, when the sample container 300 is made of quartz and the acids used are water-based, it may be desirable to select near-infrared wavelengths and short infrared wavelengths because quartz and water tend to have low absorption coefficients at these wavelengths. Thus, these wavelengths tend to allow more infrared radiation to be transmitted to the sample 400.

The controller 500 may also control the output energy of the infrared system 290. This may help maintain the sample 400 at a particular temperature for a particular time, for example, depending on the type of sample being digested or other aspects of the digestion being performed.

In view of the above, one or more embodiments herein may be capable of enhancing chemical dynamics of the digestion process, which can help achieve faster or more complete digestion. Volatile analyte and reactants can also be preserved, which can lead to better recovery of analyte elements of interest.

While the above description provides examples of one or more apparatus, methods, or systems, it will be appreciated that other apparatus, methods, or systems may be within the scope of the claims as interpreted by one of skill in the art.

The invention claimed is:

1. An apparatus for preparing samples for chemical analysis, comprising:
   a housing shaped to receive a plurality of elongated sample containers, each of the sample containers having a crucible portion at a closed distal end and an expansion portion, the housing shaped to receive each of the crucible portions of the plurality of elongated sample containers in a common heating compartment of the housing and shaped to receive each of the expansion portions of the plurality of elongated sample containers in one or more cooling compartments of the housing, the one or more cooling compartments separated from the common heating compartment by an insulating region, the common heating compartment being shaped to arrange the plurality of crucible portions along a row having a longitudinal row axis when the plurality of elongated sample containers are received in the housing;

a reflector having at least one generally planar reflecting surface for reflecting infrared radiation, the reflector mounted within the common heating compartment with the at least one generally planar reflecting surface extending generally parallel to the longitudinal row axis;

an elongated infrared heating tube having a longitudinal tube axis, the elongated infrared heating tube mounted within the common heating compartment with the longitudinal tube axis extending generally parallel to the longitudinal row axis and the elongated infrared heating tube positioned to simultaneously heat the crucible portions of the plurality of elongated sample containers; and a cooling mechanism arranged to cool the expansion portions of the plurality of sample containers in the one or more cooling compartments when the plurality of sample containers are received in the housing, wherein the reflector is positioned within the common heating compartment to reflect infrared radiation from the elongated infrared heating tube towards the crucible portions of the plurality of elongated sample containers when the plurality of elongated sample containers are received in the housing.

2. The apparatus of claim 1, wherein the crucible portion of each elongated sample container is smaller than the expansion portion.

3. The apparatus of claim 1, further comprising the plurality of elongated sample containers.

4. The apparatus of claim 1, wherein the reflector comprises three generally planar reflecting surfaces, each of the three generally planar reflecting surfaces extending generally parallel to the longitudinal row axis and at an angle to each other of the three generally planar reflecting surfaces.

5. The apparatus of claim 1, further comprising a second elongated infrared heating tube having a second longitudinal tube axis, the second elongated infrared heating tube mounted within the common heating compartment with the second longitudinal tube axis extending generally parallel to the longitudinal row axis and the second elongated infrared heating tube positioned to simultaneously heat the plurality of crucible portions.

6. The apparatus of claim 5, wherein the elongated infrared heating tube and the second elongated infrared heating tube are fused together.

7. The apparatus of claim 1, further comprising a second common heating compartment shaped to receive a second plurality of crucible portions of a second plurality of elongated sample containers, the second common heating compartment being part of the housing or being part of a second housing.

8. The apparatus of claim 7, wherein the common heating compartment and the second common heating compartment are configured such that, when the plurality of crucible portions are received in the common heating compartment and the second plurality of crucible portions are received in the second common heating compartment, the plurality of elongated sample containers and the second plurality of elongated sample containers form a plurality of columns extending generally perpendicular to the longitudinal row axis.

9. The apparatus of claim 1, wherein each sample container of the plurality of elongated sample containers includes a stopper for closing a proximal end opposite the closed distal end to achieve a partial pressure within the sample container to increase the boiling point of a liquid in the sample container.

10. The apparatus of claim 9, wherein each stopper has pinholes therein for allowing condensation in the expansion portion of the sample container.

11. A method for preparing samples for chemical analysis, comprising:
    placing a plurality of elongated sample containers in a housing with a crucible portion at a closed distal end of each sample container received in a common heating compartment of the housing and an expansion portion of each sample container received in one or more cooling compartments of the housing, the one or more cooling compartments separated from the common heating compartment by an insulating region;
    arranging the plurality of elongated sample containers within the housing such that the plurality of crucible portions are arranged within the common heating compartment in a row having a longitudinal row axis that is generally parallel to a longitudinal tube axis of an elongated infrared heating tube mounted within the common heating compartment;
    heating, simultaneously, the plurality of crucible portions in the common heating compartment using the elongated infrared heating tube; and
    cooling the plurality of expansion portions in the one or more cooling compartments using a cooling mechanism.

12. The method of claim 11, wherein the crucible portion of each elongated sample container is smaller than the expansion portion.

13. The method of claim 11, further comprising using a second elongated infrared heating tube to simultaneously heat each of the plurality of crucible portions, the second elongated infrared heating tube within the common heating compartment and having a second longitudinal tube axis extending generally parallel to the longitudinal row axis.

14. The method of claim 13, wherein the elongated infrared heating tube and the second elongated infrared heating tube are fused together.

15. The method of claim 11, wherein the housing further comprises a reflector including at least one generally planar reflecting surface for reflecting infrared radiation, the reflector mounted within the common heating compartment with the at least one generally planar reflecting surface extending generally parallel to the longitudinal row axis, wherein the reflector is positioned within the common heating compartment to reflect radiation from the elongated infrared heating tube towards the plurality of crucible portions when the plurality of sample containers are received in the housing.

16. The method of claim 15, wherein the reflector comprises three generally planar reflecting surfaces, each of the three generally planar reflecting surfaces extending generally parallel to the longitudinal row axis and at an angle to each other of the three generally planar reflecting surfaces.

17. The method of claim 11, further comprising using a second common heating compartment to heat a plurality of crucible portions of a second plurality of sample containers, the second common heating compartment being part of the housing or being part of a second housing.

18. The method of claim 17, wherein the common heating compartment and the second common heating compartment are configured such that, when the plurality of crucible portions are received in the common heating compartment and the second plurality of crucible portions are received in the second common heating compartment, the plurality of crucible portions and the second plurality of crucible portions form a plurality of columns extending generally perpendicular to the longitudinal row axis.

19. The method of claim 11, further comprising closing a proximal end opposite the closed distal end of each sample container using a stopper.

20. The method of claim 19, wherein each stopper has pinholes therein for allowing condensation in the expansion portion of the sample container.

21. An apparatus for preparing samples for chemical analysis, comprising:
- a housing shaped to receive a plurality of elongated sample containers, each of the sample containers having a crucible portion at a closed distal end and an expansion portion, the housing shaped to receive each of the crucible portions of the plurality of elongated sample containers in a common heating compartment of the housing and shaped to receive each of the expansion portions of the plurality of elongated sample containers in one or more cooling compartments of the housing, the one or more cooling compartments separated from the common heating compartment by an insulating region, the common heating compartment being shaped to arrange the plurality of crucible portions along a row having a longitudinal row axis when the plurality of elongated sample containers are received in the housing;
- an elongated infrared heating tube having a longitudinal tube axis, the elongated infrared heating tube mounted within the common heating compartment with the longitudinal tube axis extending generally parallel to the longitudinal row axis and the elongated infrared heating tube positioned to simultaneously heat the plurality of crucible portions when the plurality of sample containers are received in the housing; and
- a cooling mechanism arranged to cool the plurality of expansion portions of the plurality of sample containers in the one or more cooling compartments when the plurality of sample containers are received in the housing.

22. The apparatus of claim 21, wherein the housing includes an opening for providing air flow into the common heating compartment from outside the housing.

* * * * *